April 3, 1956     P. J. VAUGHAN     2,740,742
STRETCHING OF FILM FOLLOWED BY LAMINATION
Filed Sept. 24, 1954
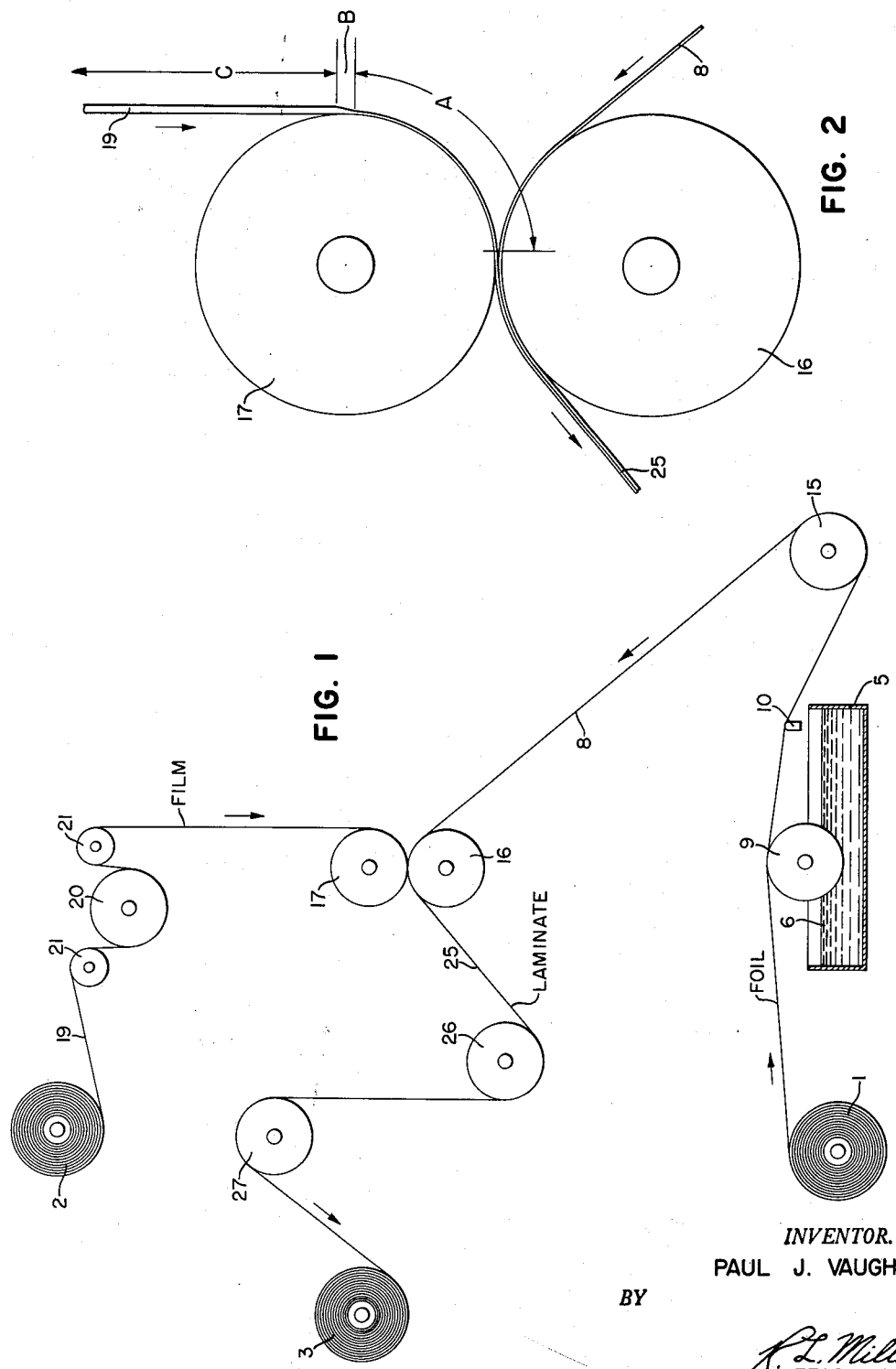
INVENTOR.
PAUL J. VAUGHAN
BY
P. L. Miller
ATTORNEY

2,740,742

STRETCHING OF FILM FOLLOWED BY LAMINATION

Paul J. Vaughan, Cuyahoga Falls, Ohio, assignor to The Goodyear Tire & Rubber Company, Akron, Ohio, a corporation of Ohio Application September 24, 1954, Serial No. 458,153

4 Claims. (Cl. 154—124)

This invention relates to the stretching of thermoelastic film to extremely thin gauges and the lamination of this stretched film to sheet material of stable dimensions while still hot and in an extended state. The film is heated advantageously by the heat from a hot roll used in the subsequent lamination, and is then immediately stretched, and is then maintained in contact with this heat laminating roll until it is annealed and loses its tendency to shrink. It is then laminated. The laminate possesses no, or substantially no, tendency to curl.

It is difficulty to manufacture films of extreme thinness by casting, extrusion, or the like. Laminations of such materials to sheet materials present many problems. For one thing, the small variations in gauge which occur in such extremely thin materials make it extremely difficult to maintain them extended as a non-wrinkled smooth sheet.

Thermoelastic films as thick as .0005 inch or perhaps somewhat thicker, such as films .0006 or .00075 inch thick and thicker, may be cast or otherwise formed directly without too much difficulty and they may be handled by packaging equipment, etc., designed for handling the usual web materials. However, the thiner films, that is films less than .0005 inch thick, are difficult to produce by casting or extrusion, and these films and, more particularly, the thinner tenuous films such as films no more than .00025 inch thick cannot be handled satisfactorily in the ordinary web-handling equipment. When thermoelastic films are heated and stretched, stresses are developed in them which cause them to tend to shrink, and this tendency remains with them even after they have been cooled. For instance, rubber hydrochloride film which has been heated and stretched to 400 per cent of its original length, will shrink some 5 to 15 per cent during the next 24 hours. This tendency to shrink is overcome by annealing the stretched film at about the temperature at which it is stretched.

As the various thermoelastic films have properties such as high moisture resistance, grease resistance, heat sealability, etc., not found in the usual packaging materials such as paper, metal foil, and even cellophane and the like, they are in demand for the production of laminates, but in the thicker forms are prohibitively expensive.

According to this invention laminates are produced from very thin thermoelastic films having such desirable properties.

To overcome the difficulties encountered in delivering the film materials in pre-stretched condition to the laminating equipment, and to prevent the film from shrinking after being laminated, the invention contemplates the stretching of the film material to very thin gauges and then maintaining it at substantially the stretching temperature, or above, until it has lost its tendency to shrink, all as a part of the lamination operation. The film is heated and stretched immediately prior to the lamination, and between the stretching operation and the bite of the laminating rolls it is supported on the surface of one of the rolls so as to prevent it from wrinkling or puckering and it is here heated so as to prevent it from shrinking, all of which objectionable features are encountered if the film is stretched to the thinness herein contemplated and then delivered to the bite of the laminating rolls over any unsupported span or without being maintained at about the stretching temperature until it has been annealed.

The laminates of this invention are formed of stretched thermoelastic film and the material cost is less, in the ratio by which the film is stretched, and may be appreciably less than the cost of laminates produced from unstretched film. In the laminates made from unstretched film, the film is often thicker than is necessary or desirable, so the laminate made with the thinner stretched film is not only cheaper than that made with the unstretched film, but also has improved properties such as greater flexibility, etc. Also, the stretched film may have improved tensile strength properties in the direction in which it is stretched, which is the direction it is passed through the packaging machinery, minimizing breakage of the laminated web while in use.

The thermoelastic films used in producing laminates according to this invention include, for example, rubber hydrochloride films, polyethylene films, and the vinyl films (including polymers of vinyl chloride and copolymers thereof), cellulose acetate, etc. The film employed will depend upon the properties desired in the final product. Thus, some films will impart moisture resistance to the laminate; others will impart grease resistance, etc.

The sheet material to which the stretched film is laminated may be metal foil or other foil, and may be kraft paper, glassine paper, parchment paper, cellophane, chip board, fabric, etc., and may even be thermo-stretchable, but in that event the temperature of thermostretchability must be well above the laminating temperature, to prevent stretching of the hot, freshly laminated product. Three or more plies, including at least one stretchable film, may be laminated to one another. For instance, film from two supply rolls may be laminated to opposite surfaces of foil or other sheet material, and may be stretched as herein described, substantially simultaneously with the lamination.

The adhesive employed may be drying or non-drying. It may be applied as a latex or a hot melt or lacquer. If applied as a lacquer adhesive, the solvent is preferably entirely evaporated before the laminae are brought into contact with one another. The selection of the adhesive will depend to some extent upon the properties desired in the laminated material. The adhesive may be a natural composition, or it may be synthetic.

The invention will be further described in connection with the stretching of rubber hydrochloride film and its lamination to aluminum foil, using molten wax as the adhesive, to produce a heat-sealable packaging web. However, it is to be understood that in its broader aspects the invention is not limited thereto, and this preferred operation is disclosed as illustrative of the invention.

In the drawings,

Fig. 1 illustrates diagrammatically the equipment employed, and the process of laminating according to the invention; and Fig. 2 is an enlarged detail which illustrates where the film is stretched and where it is annealed.

The aluminum foil is supplied from the supply roll 1. The rubber hydrochloride film is supplied from the supply roll 2. The laminated sheet is rolled up on the wind-up roll 3.

Rubber hydrochloride film is ordinarily stretched at about 200° F. Socony-Vacuum Magnawax or other microcrystalline wax of petroleum origin with a melting point of 145 to 175° F. has been found to be a very satisfactory adhesive for such film. The wax was contained in the wax bath 5 which was heated by coils (not shown). The molten wax is illustrated at 6. It was applied to the undersurface of the foil 8 by the pick-up roll 9. Excess molten wax was removed from the foil by the doctor blade 10. The foil was coated on one side with the molten wax, and then passed over the guide roll 15 to the bite rolls 16 and 17 which served both for stretching the film and laminating it to the foil. These rolls were heated with steam to 212° F.

The rubber hydrochloride film 19 was drawn from the supply roll 2 into the bite of the rolls by the driven roll 20. Guide rolls 21 increase the area of contact between the film and the roll 20, and thus prevent slippage of the film on the surface of the roll.

The film became soft and stretchable as it contacted the roll. It was supported by this roll throughout its entire width in the stretched condition substantially free of wrinkles (both longitudinal and transverse) throughout the period from the time it was stretched until it was laminated to the foil. During this period of contact with the heated roll it was maintained at substantially the stretching temperature and was thereby annealed, losing all, or substantially all, tendency to shrink thereafter. The stretching occurred within a very narrow area of tangency to the roll, and no substantial decrease in width was exhibited by the freshly stretched film. The tenuous web of freshly stretched film was conducted in this manner by the surface of the heated roll 17 into contact with the coating of adhesive on the foil 8, and into the bite of the rolls, and was thereafter supported by the foil. It is thus possible to laminate extremely thin gauges of a hot thermoelastic film to foil and other sheet materials which have dimensional stability at the temperatures encountered.

To minimize air entrapment and the possibility of prelaminated contact of the sheet with the film not only was a substantial length of the film 19 supported by its roll 17 before it entered the bite, but a substantial length of the sheet 8 also was supported by its roll 16 before it entered the bite. Thus, the laminae were brought together at the bite at a wide angle at which the possibility of air entrapment was negligible. Since the sheet was supported by the hot radial surface of the roll without puckering or wrinkling, and was in contact with this hot roll for a sufficient time to lose its tendency to shrink, the resultant quality of the lamination was improved by the absence of any tendency to curl and the absence of defacing air entrapment which would result from unlaminated areas.

By this process of lamination the possibility of the lateral displacement of the sheets bringing the edges out of alignment is remote. The thin stretched film is supported throughout its life and during this support loses its tendency to shrink, and it is positively guided by the roll surface into the area of the bite which is covered by the sheet material 8. This eliminates loss of film which extends beyond the edges of the sheet material and must be trimmed away.

After passing through the heated bite rolls 16 and 17 the laminate 25 was drawn over the cold rolls 26 and 27 where the adhesive was hardened. The laminate was then rolled up on the wind-up 3.

The rolls 9, 15, 16, 17, 26, and 27 were all driven at the same speed, and the wind-up roll 3 was driven at a constant surface speed equivalent to the speed of the above-mentioned rolls. The roll 20 was also driven, but was driven at a speed only one-fourth of the speed of the rolls 16 and 17. The speed of the roll 20 being only one-fourth of the speed of the rolls 16 and 17, the heated and softened film was stretched to four times its original length substantially simultaneously with the lamination. Alternatively, the film might be stretched to only double its length, or to several times its length.

When rubber hydrochloride film plasticized with 10 parts of butyl stearate to 100 parts of rubber hydrochloride was laminated to foil, and it was maintained in contact with one quarter of the surface of the roll 17 (as illustrated in Figs. 1 and 2), the roll being 5 inches in diameter, heated to 220° F., and traveling at a surface speed of 72 R. P. M., and the film was stretched from 0.00075 inch to 0.00018 inch thick, the stretched film was kept in contact with the heated roll 17 for about 1/8 second and this was sufficient to anneal it. It permanently lost its tendency to shrink.

The film prior to entering the bite of the rolls passed through three different states. This is best illustrated by Fig. 2. The stretched film in the zone A was hot and supported by the roll 17. It was maintained in a heated condition by the roll and lost its tendency to shrink. The zone B in which it was stretched is very narrow. In zone C, prior to being stretched, the film was cold and unstretched. The film was heated by the heated roll 17 and the area of the film in the stretching zone B approached a straight line. This was because the modulus of the heated, unstretched thermoelastic film is less than the modulus of the cold, unstretched film and less than the modulus of the hot, stretched film. Thus, the stretching occurred in a very narrow area of the film just as the film contacted the roll 17. The exact location of the zone B depends upon the softening point of the film, the temperature to which the roll 17 is heated, and the rate at which the film is traveling. The whole area of the heated, stretched film was supported by the heated roll. The zones indicated in Fig. 2 are for illustration only, and the scope of the invention is in no wise limited thereto.

As the film and foil were drawn through the bite of the rolls 16 and 17, sufficient pressure was applied to laminate the film to the foil by the molten wax. After leaving the laminating rolls the heated and stretched film was supported by the foil. The film had been annealed and lost its tendency to shrink when it was brought into contact with the foil. Therefore, the laminate had no tendency to curl. The laminate was passed over the cooling rolls 26 and 27, and the cooling was preferably sufficient to rapidly solidify the wax.

In one operation rubber hydrochloride film containing 10 parts of butyl stearate was used, and this was stretched from a gauge of 0.00075 inch to .00018 inch. This stretched film was laminated to aluminum foil of 0.0005 inch. In this lamination the wax was about 0.00015 inch thick. (The gauge of the wax can be controlled by adjustment of the doctor knife 10). This laminate had a drop height of 11 inches at each of the temperatures 0° F., 38° F., and 77° F. Its tensile strength measured in pounds per square inch was 5580 across the laminate and 7250 longitudinally of the laminate. Moisture vapor determinations were made on unfolded laminate and laminate folded in 1-inch square, and it was found that the moisture vapor transfer rate in grams per 100 square inches for 24 hours was zero for the unfolded laminate and 0.089 for the folded laminate.

By laminating stretched rubber hydrochloride film to cellulosic materials such as paper, chip board, etc., grease resistant products are obtained which may be used to advantage in the packaging of bakery products.

The laminating agent used in producing laminates from rubber hydrochloride film and other plastic films may be latex type, lacquer type, or thermosetting.

The latex type may be a butadiene-styrene polymer suspended in water, similar to Union Paste Adhesive M-497. The aqueous type adhesive may be used where the plastic film is combined with a porous material. This porous material will allow the evaporation of water through the sheet with permanent adhesion after the material is completely dry. The water may all be removed as a result of the heat supplied by the laminating rolls. If desired, a part of the water may be removed before the sheet enters the laminating rolls, and the sheet leaving the laminating rolls may go through a drying oven which will remove the remainder.

The lacquer adhesive may have a base of rubber, a cellulosic material, etc. Bondmaster L-297 furnished by Rubber and Asbestos Corporation is illustrative. The solvent is preferably entirely removed by heating means located before the bite rolls so that the adhesive is free of solvent when it enters the bite. The heated laminating rolls serve to soften and thus activate the dry adhesive.

The adhesive may be a wax of the microcrystalline type, such as Socony-Vacuum Magnawax, melting between 140 and 170° F. Additional tackifying agents may be added to these waxes, such as butyl rubber furnished by Standard Oil Company. The waxes are activated and become molten through the heat conveyed to them by the laminating rolls. The adhesion is strengthened when the wax is solidified by roll 26, and the stock is wound up on roll 3.

The nature of the laminate will be varied depending upon the use to which it is to be put. Laminates having widely different properties may be made from different films such as polyethylene, rubber hydrochloride, the vinyl films, etc., differently plasticized, etc., sheet materials such as the different varieties of paper, including glassine, etc., and the different foils including lead foil, etc. One or both of the plies being laminated may be fed directly into the bite of the laminating rolls from the supply rolls to minimize the likelihood of a ply becoming wrinkled. In that case the adhesive is advantageously supplied directly to a bank maintained at the line where the film and foil come into contact, as by dropping melted adhesive onto the bank. The properties of the product may be changed by varying the composition or thickness of the film or sheet or the adhesive employed.

The invention is defined in the appended claims.

What I claim is:

1. The method of laminating (1) a thermoelastic film which is at least 0.0005 inch thick and (2) a sheet which has dimensional stability in the presence of heat, by means of an adhesive, which comprises moving the film and the sheet through the bite of pressure rolls, applying the adhesive uniformly over at least one of the surfaces of said laminae which are to be united before entering the bite, and heating the film to the point of softening and simultaneously stretching the film at least 100 per cent to a thickness no greater than 0.0005 inch, heating one of said rolls to substantially the temperature at which the film is stretched, and maintaining a substantial length of the stretched film in flat contact with that roll substantially continuously from the time it is stretched until it enters the bite and has thereby been annealed and permanently lost its tendency to shrink.

2. The process of claim 1 in which the thermostretchable film is rubber hydrochloride film.

3. The method of laminating (1) a thermoelastic film which is at least 0.0005 inch thick and (2) a sheet which has dimensional stability in the presence of heat, by means of an adhesive, which comprises moving the film and the sheet through the bite of a pair of pressure rolls, applying the adhesive uniformly over at least one of the surfaces of said laminae which are to be united before entering the bite, supporting a substantial length of the film on one of the rolls and heating that roll to the stretching temperature of the film, and supporting a substantial length of the sheet on the other roll immediately prior to entering the bite, and heating the film from the heated roll and stretching it at least 100 per cent to a thickness no greater than 0.0005 inch as it comes into such supporting contact with its roll whereby the film is maintained in a stretched and wrinkle-free condition substantially continuously between the time it is stretched and the time it is laminated and is thereby annealed and permanently loses its tendency to shrink.

4. The method of claim 3 in which the thermostretchable film is rubber hydrochloride film and the roll which supports and anneals the film is heated to substantially 200° F.

References Cited in the file of this patent

UNITED STATES PATENTS

| | | |
|---|---|---|
| 2,259,362 | Young | Oct. 14, 1941 |
| 2,286,569 | Pollack | June 16, 1942 |
| 2,351,350 | Mallory | June 13, 1944 |
| 2,397,838 | Chavannes | Apr. 2, 1946 |
| 2,546,705 | Strawinsky | Mar. 27, 1951 |